(12) United States Patent
Takeuchi (10) Patent No.: US 7,885,196 B2
(45) Date of Patent: Feb. 8, 2011

(54) LOOP COMMUNICATION SYSTEM AND COMMUNICATION DEVICE

(75) Inventor: Junichi Takeuchi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 442 days.

(21) Appl. No.: 11/454,038

(22) Filed: Jun. 16, 2006

(65) Prior Publication Data

US 2006/0285547 A1    Dec. 21, 2006

(30) Foreign Application Priority Data

Jun. 17, 2005   (JP)   ............................. 2005-178308

(51) Int. Cl.
*H04L 12/42*   (2006.01)
*H04L 12/28*   (2006.01)
(52) U.S. Cl. ...................................... 370/249; 370/404
(58) Field of Classification Search ................ 370/403, 370/404, 405, 406, 249
See application file for complete search history.

(56) References Cited

U.S. PATENT DOCUMENTS

| | | | | |
|---|---|---|---|---|
| 5,526,353 A | * | 6/1996 | Henley et al. | 370/392 |
| 6,477,171 B1 | * | 11/2002 | Wakeley et al. | 370/404 |
| 6,680,915 B1 | * | 1/2004 | Park et al. | 370/254 |
| 6,728,249 B2 | * | 4/2004 | Chang | 370/395.3 |
| 6,961,335 B1 | * | 11/2005 | Millet et al. | 370/356 |
| 7,190,704 B2 | * | 3/2007 | Rabenko et al. | 370/508 |
| 2001/0010694 A1 | * | 8/2001 | Lindsey et al. | 370/405 |
| 2003/0189922 A1 | * | 10/2003 | Howe | 370/352 |
| 2004/0163120 A1 | * | 8/2004 | Rabenko et al. | 725/111 |
| 2008/0232525 A1 | * | 9/2008 | Nakayama et al. | 375/356 |
| 2008/0294276 A1 | * | 11/2008 | Nakayama | 700/94 |
| 2009/0290483 A1 | * | 11/2009 | Curtis et al. | 370/216 |

FOREIGN PATENT DOCUMENTS

| | | |
|---|---|---|
| JP | 11-32067 A | 2/1999 |
| JP | 2001-162894 A | 6/2001 |
| JP | 2002-354019 A | 12/2002 |
| JP | 2003-198548 A | 7/2003 |

* cited by examiner

*Primary Examiner*—Gregory B Sefcheck
(74) *Attorney, Agent, or Firm*—Sughrue Mion, PLLC (57) ABSTRACT

A loop communication system includes a plurality of communication devices, each of which holds an identification data assigned to the communication device, and has a single port used for transmission and reception of a data packet for a transmission data, and which are connected by using the ports to constitute a port synchronization type network of a loop structure. The data packet from each of the plurality of communication devices is transferred on the network of the loop structure in one direction.

9 Claims, 11 Drawing Sheets

① | DATA PREFIX | RECEPTION DATA | DATA END |

② | RECEPTION DATA |

③ | DATA PREFIX | TRANSMISSION DATA | DATA END |

④ | RECEPTION ARBITRATION CODE |

⑤ | TRANSMISSION ARBITRATION CODE |

① | TRANSMISSION DATA |

② | DATA PREFIX | TRANSMISSION DATA | DATA END |

③ | DATA PREFIX | RECEPTION DATA | DATA END |

④ | RECEPTION DATA |

Fig. 12

① | TRANSMISSION DATA |

② | DATA PREFIX | DATA ID | TRANSMISSION DATA | DATA END |

③ | DATA PREFIX | DATA ID | RECEPTION DATA | DATA END |

④ | RECEPTION DATA |

LOOP COMMUNICATION SYSTEM AND COMMUNICATION DEVICE

BACKGROUND OF THE INVENTION

1. Field of the Invention

The present invention relates to a loop communication system, a communication device, and a loop communication method in a network constituted by a serial bus such as IEEE 1394 which is employed in digital products such as a personal computer and a digital home electrical appliance.

2. Description of the Related Art

Figure 1:
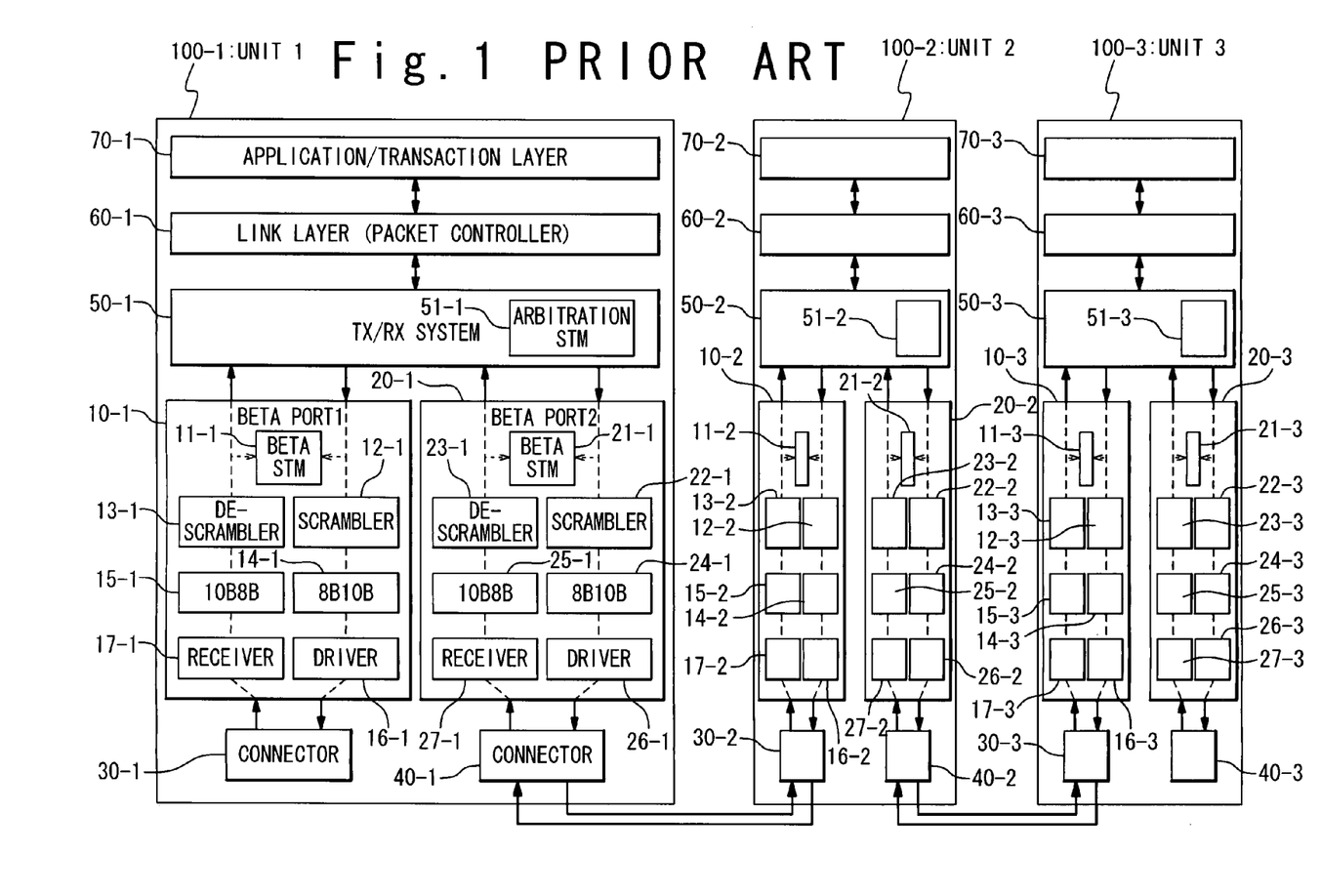
FIG. 1 is a block diagram showing a configuration of a conventional communication system.

A communication system based on IEEE 1394b is conventionally known. FIG. 1 is a block diagram showing a configuration of the conventional communication system based on IEEE 1394b. Referring to FIG. 1, the communication system includes three communication units 100-$i$ ($i$=1, 2, 3). Each unit 100-$i$ is provided a port 1 (Beta Port1) 10-$i$, a port 2 (Beta Port2) 20-$i$, a connector 30-$i$, a connector 40-$i$, a transmission/reception system (TX/RX System) circuit 50-$i$, a link layer control circuit 60-$i$, an application/transaction layer control circuit 70-$i$. The connector 30-$i$ is provided for the port 1 (Beta Port1) 10-$i$, and similarly, the connector 40-$i$ is provided for the port 2 (Beta Port2) 20-$i$. The transmission/reception system (TX/RX System) circuit 50-$i$ is located at a logically upper position of the port 1 (Beta Port1) 10-$i$ and the port 2 (Beta Port2) 20-$i$. Also, the link layer control circuit 60-$i$ is located at a logically upper position of the transmission/reception system circuit 50-$i$, and the application/transaction layer control circuit 70-$i$ is located at a logically upper position of the link layer control circuit 60-$i$. The transmission/reception system (TX/RX System) circuit 50-$i$ includes an arbitration state machine (STM) 51-$i$ to manage a transmission right on a bus. Also, the communication units 100-1 and 100-2 are connected between connectors 40-1 and 30-2 through a bi-directional cable to allow dual transmission/reception, and the communication units 100-2 and 100-3 are connected between connectors 40-2 and 30-3 through a bi-directional cable to allow dual transmission/reception. Thus, a network of communication units 100-1, 100-2 and 100-3 is The Beta Port1 10-$i$ is provided with a beta port state machine 11-$i$ for executing management of synchronization with a connection destination, a scrambler 12-$i$, a de-scrambler 13-$i$, an 8B10B coding circuit 14-$i$, a 10B8B coding circuit 15-$i$, a driver 16-$i$ and a receiver 17-$i$. The Beta Port2 20-$i$ is provided with a beta port state machine 21-$i$ for executing management of synchronization with a connection destination, a scrambler 22-$i$, a de-scrambler 23-$i$, an 8B10B coding circuit 24-$i$, a 10B8B coding circuit 25-$i$, a driver 26-$i$ and a receiver 27-$i$.

As described above, the port 2 (Beta Port2) 20-1 of the unit 1 100-1 is connected through the cable to the port 1 (Beta Port1) 10-2 of the communication unit 2 100-2, and the port 2 (Beta Port2) 20-2 of the communication unit 2 100-2 is similarly connected through the cable to the port 1 (Beta Port1) 10-1 of the communication unit 3 100-3. In the dual communication system defined based on IEEE 1394b, both of the transmission and the reception are carried out through the single cable. Thus, a transmission line and a reception line exist in one cable. Also, when the network is built up from the three or more units, the unit having the two or more ports is necessarily required as the communication unit 2 100-2 in FIG. 1. In this way, the requirements of the two ports and the cable having the two lines are constraint when the space saving and the cost down are aimed.

The mechanism of the data transmission/reception will be described below. When data is transmitted from the application control circuit 70-$i$ to a different unit through the cable, the arbitration state machine 50-$i$ arbitrates a transmission right. Then, after obtaining the transmission right, the communication unit 100-$i$ transmits the data onto the cable through the port (Beta Port) 20-$i$ and the connector 40-$i$. At the time of the reception, data is received through the cable and the connector 40-$i$ to the port (Beta Port) 20-$i$, and is sent to the application control circuit 70-$i$. As described above, in the communication network in which the three communication units 100-1, 100-2 and 100-3 are connected, the data transmitted from the port 2 (Beta Port2) 20-1 of the communication unit 1 100-1 is received through the transmission/reception dual cable by the port 1 (Beta Port1) 10-2 of the communication unit 2 100-2. At the same time, in the communication unit 2 100-2, the data is transferred to the port 2 (Beta Port2) 20-2, and is transmitted through the transmission/reception dual cable to the communication unit 3 100-3. The communication unit 3 100-3 carries out the reception of the data by the port 1 (Beta Port1) 10-3.

Figure 2:
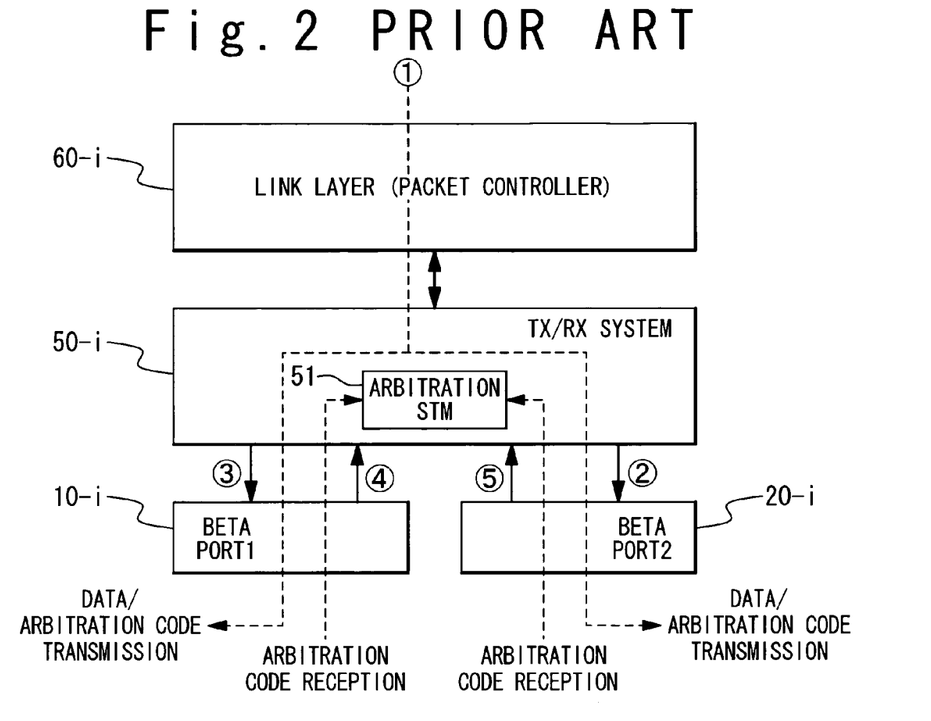
FIG. 2 is a diagram showing transmission and reception operations in the conventional communication system.
Figure 3:
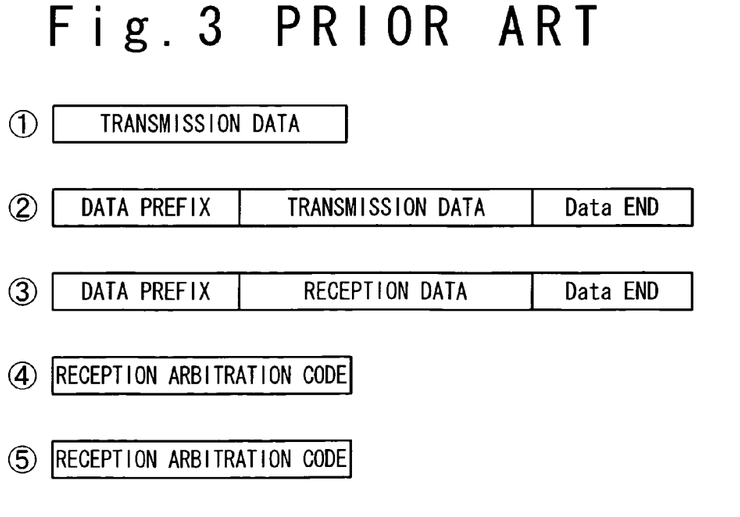
FIG. 3 is a diagram showing data formats in the conventional communication system in FIG. 2.
Figure 4:
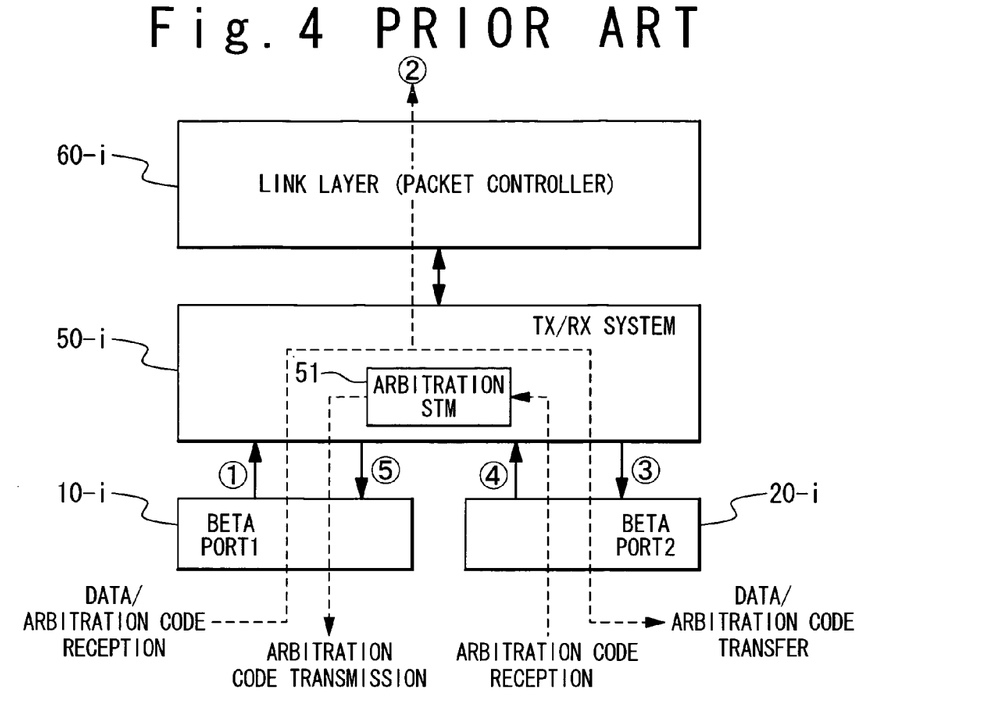
FIG. 4 is a diagram showing transmission and reception operations in the conventional communication system.
Figure 5:
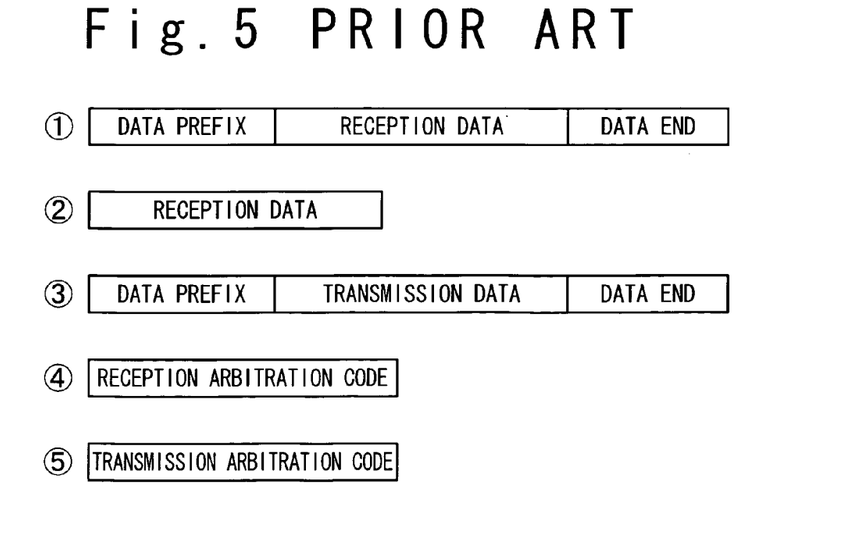
FIG. 5 is a diagram showing data formats in the conventional communication system in FIG. 5.

Next, the operation at the time of communication will be described below with reference to FIGS. 2 to 5. This operation is in case of the IEEE 1394b (a conventional technique with no loop structure). FIG. 2 shows transmission and reception operations. An output request data is outputted from the application control circuit 70-$i$ of the unit 100-$i$ to the port 1 (Beta Port1) 10-$i$ and the port 2 (Beta Port2) 20-$i$. Also, at the same time, an arbitration code or arbitration signal is received from the port 1 (Beta Port1) 10-$i$ and the port 2 (Beta Port2) 20-$i$ to obtain the transmission right. FIG. 3 shows data formats in this case. When the data is transmitted to the cable side, a data prefix is transmitted prior to the data, and a data end is transmitted after the data. FIG. 4 shows reception and transfer functions. At the time of the data reception, at the same time as the transmission of the data to the application side or the link side, the data is transferred to the port 2 (Beta Port2) 20-$i$. When the arbitration code signal is received from the port 2 (Beta Port2) 20-$i$, the arbitration of the transmission right is carried out by the transmission/reception system (TX/RX System) circuit 50-$i$, and the arbitration code signal is transmitted to the port 1 (Beta Port1) 10-$i$. FIG. 5 shows data formats in FIG. 4. The data prefix and the data end has been added to the transmission/reception data.

Figure 6:
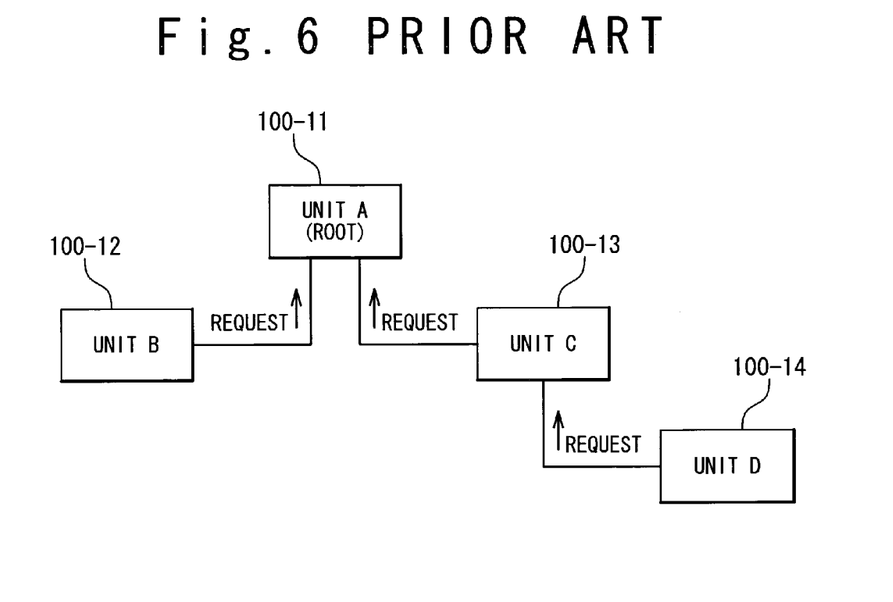
FIG. 6 is a first diagram showing a procedure example of arbitration in the conventional communication system.
Figure 7:
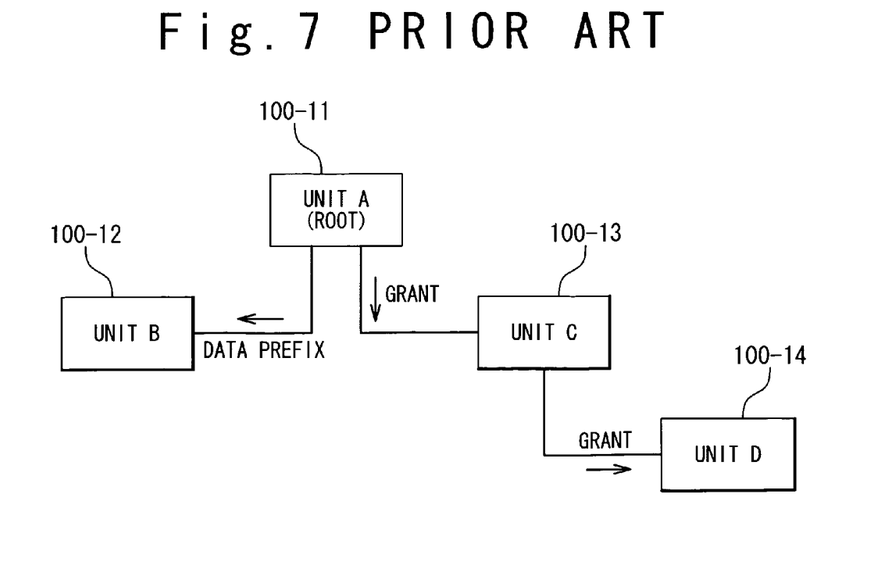
FIG. 7 is a second diagram showing another procedure example of the arbitration in the conventional communication system.

The mechanism of the transmission right arbitration will be described below. FIG. 6 is a diagram showing a flow of request in a conventional configuration. FIG. 7 is a diagram showing a flow of grant in the conventional configuration. The system has a unit A 100-11, a unit B 100-12, a unit C 100-13, and a unit D 100-14 as an example. It is assumed that a request is issued from the unit B 100-12 and the unit D 100-14 as the arbitration code. Here, the unit A 100-11 is a root that can determine distribution of the transmission right. If the transmission right is given to the unit D 100-14, the data prefix is indicated to the unit B 100-12, and a grant signal is sent to the unit D 100-14. Consequently, the unit D 100-14 obtains the transmission right.

In FIG. 1, the port 1 (Beta Port1) 10 of the communication unit 1 100-1 and the port 2 (Beta Port2) 20 of the communication unit 3 100-3 are not used. Also, the total number of the transmission/reception lines is (Cable Transmission/Reception Pair (Two Lines)×2=4 lines. In order to miniaturize the circuit scale and down the cost, the excessive ports and transmission/reception lines are required to be omitted.

Also, in the IEEE 1394b, a network is defined in which synchronization is established in the port (Beta Port). Thus, although a loop connection is possible, the data communication is impossible because of automatic separation. That is, even if the loop is formed physically, the loop is not formed on the communication because the loop is separated.

Figure 8A:
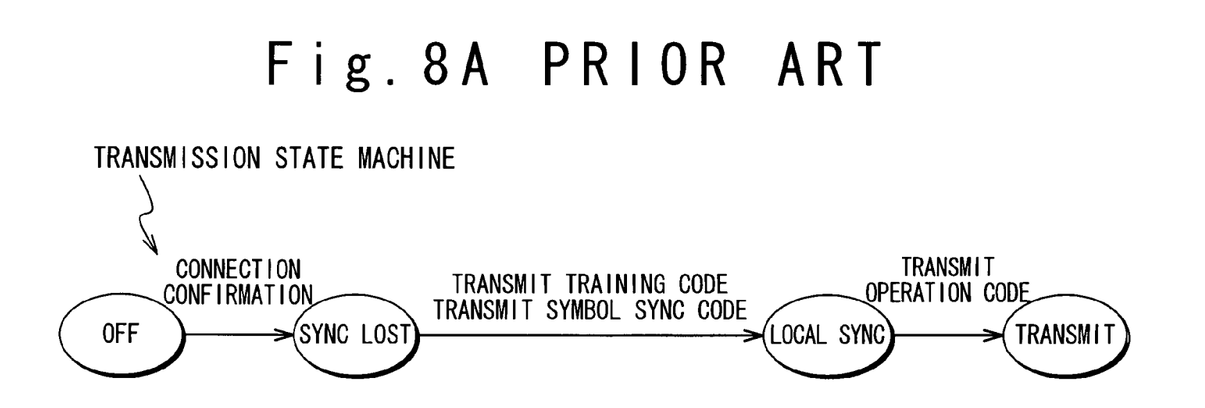
FIGS. 8A and 8B are state transition diagrams of Beta ports.
Figure 8B:
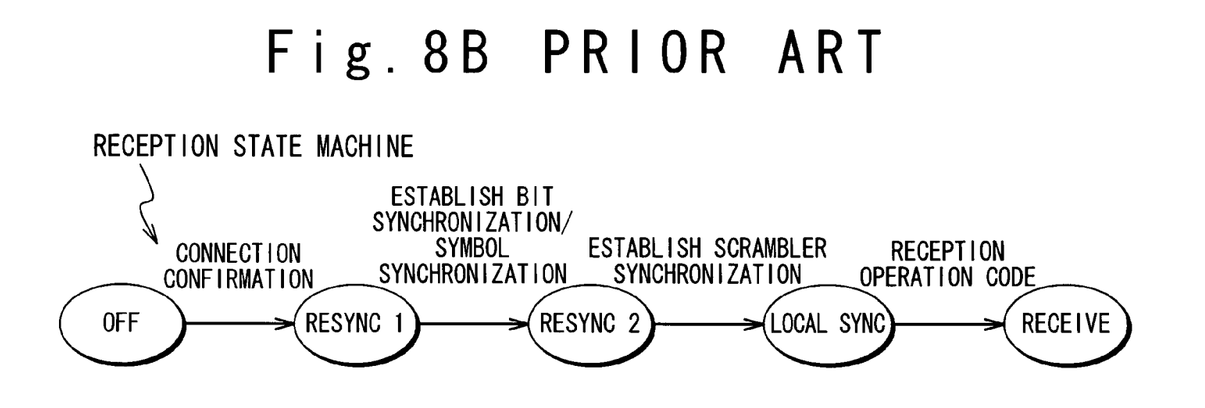

Moreover, in the IEEE 1394b, under the management by the state machine shown in FIGS. 8A and 8B, the port (Beta Port) has a synchronization establishing function. When the loop is configured in the synchronous communication such as the IEEE 1394b, the same data continues to be repeatedly transmitted, and a folded communication is impossible for the arbitration code (arbitration signal). Thus, a trouble occurs. For example, the Grant for the Request cannot be accurately issued.

In conjunction with the above description, a transmission system is disclosed in Japanese Laid Open Patent Publication (JP-A-Heisei, 11-32067), in which a fault frame can be surely removed when a network of a loop structure is used. In this conventional transmission system, a plurality of nodes are coupled to a transmission path, and data is mutually transmitted and received through the transmission path. The node carries out a transmission process on a communication frame having a transmission data to assign a node passage identifier indicative of the number of frames passing through the node, in addition to a reception node identifier. On the other hand, the node carries out a reception process when the received communication frame is destined for the node itself. Also, in the node, a transmission/reception processing unit carries out a transmission process for relaying the communication frame on the transmission path if the received communication frame is not destined for the node itself. Also, a trouble frame discarding unit updates a value of the node passage identifier of the received communication frame, and stops the relaying if the number of frames is determined to reach a preset number from the value. In this way, this conventional example controls transmission by counting the reception data and is applicable to the configuration of FIG. 1.

SUMMARY OF THE INVENTION

It is an object of the present invention to makes a loop connection possible in a port synchronization type communication.

Another object of the present invention is to provide a loop communication system using communication devices, and a loop communication method in which a data ID is added to a data or an arbitration code.

Still another object of the present invention is to attain a more accurate data transfer and prevent unnecessary circulation of the same data.

In an aspect of the present invention, a loop communication system includes a plurality of communication devices, each of which holds an identification data assigned to the communication device, and has a single port used for transmission and reception of a data packet for a transmission data, and which are connected by using the ports to constitute a port synchronization type network of a loop structure. The data packet from each of the plurality of communication devices is transferred on the network of the loop structure in one direction.

Here, each of the plurality of communication devices may include a transmission/reception control circuit, a single connector connected to two of the plurality of communication devices through first and second cables, and a beta port connected between the transmission/reception control circuit and the connector and configured to transfer the data packet received through the first cable and the connector to the transmission/reception control circuit and to transfer the data packet received from the transmission/reception control circuit onto the second cable through the connector.

Also, in the communication device, the transmission/reception control circuit may receive the data packet from an upstream one of the plurality of communication devices through the first cable, the connector and the beta port, and determine whether an identification data contained in the data packet is coincident with the held identification data. The transmission/reception control circuit may discard the data packet when the contained identification data is identical to the held identification data.

Also, the transmission/reception control circuit may transmit the packet data to a downstream one of the plurality of communication devices through the beta port, the connector and the second cable.

Also, the communication device may include a link layer control circuit configured to generate and send a data prefix and a data end to the transmission/reception control circuit when the transmission data should be transmitted to a destination communication device, and an application/transaction control circuit configured to generate and send the transmission data to the link layer control circuit when the transmission data should be transmitted to a destination communication device. The transmission/reception control circuit may add the held identification data after the data prefix of the data packet and transmits to a downstream one of the plurality of communication devices through the beta port, the connector and the second cable.

Also, the application/transaction control circuit may issue a request of transmission right, and the transmission/reception control circuit may add the held identification data to the request and transmits to a root one of the plurality of communication devices.

Also, the transmission/reception control circuit of the root communication device may include an arbitration state machine configured to carry out arbitration of the transmission right in response to the request. Then, the transmission/reception control circuit may add the identification data contained in the request to a grant signal when the request is allowed, and transmit the grant signal with the contained identification data to the request issuing communication device.

Also, the beta port may include a port state machine configured to carry out synchronization management with other units; a receiver configured to receive the data packet to send to the transmission/reception control circuit; and a driver configured to drive the data packet from the transmission/reception control circuit to the second cable through the connector.

Another aspect of the present invention relates to the communication device used in the above.

Also, still another aspect of the present invention, a loop communication method is directed, in which a plurality of communication devices are connected to constitute a network of a loop structure, and each of the plurality of communication devices holds an identification data assigned to the communication device. The loop communication method is achieved by generating a data packet; and by transmitting the data packet from each of the plurality of communication devices to a downstream one of the plurality of communication devices on the network of the loop structure in one direction. The generating a data packet is achieved by generating a transmission data; by adding a data prefix prior to the transmission data; by adding the held identification data after the data prefix and before the transmission data; and by adding a data end after the transmission data.

Also, the transmitting the data packet may be achieved by receiving the data packet from an upstream one of the plurality of communication devices; by determining whether the identification data contained in the data packet is coincident with the held identification data; and by discarding the data packet when the contained identification data is identical to the held identification data.

Also, the transmitting the data packet may be achieved by transmits the packet data to a downstream one of the plurality of communication devices.

Also, the loop communication method may be achieved by further issuing a request of transmission right; adding the held identification data to the request; and transmitting the request with the identification data to a root one of the plurality of communication devices.

Also, the loop communication method may be achieved by further carrying out arbitration of the transmission right in the root communication device in response to the request; adding the identification data contained in the request to a grant signal when the request is allowed; and transmitting the grant signal with the contained identification data to the request issuing communication device.

In still another aspect, the preset invention relates to a recording medium storing a computer program for executing the loop communication method.

DESCRIPTION OF THE PREFERRED EMBODIMENTS

Hereinafter, a loop communication system of the present invention will be described in detail with reference to the attached drawings. A unit used in the present invention is a communication unit based on the standard of the IEEE 1394b.

First Embodiment

Figure 9:
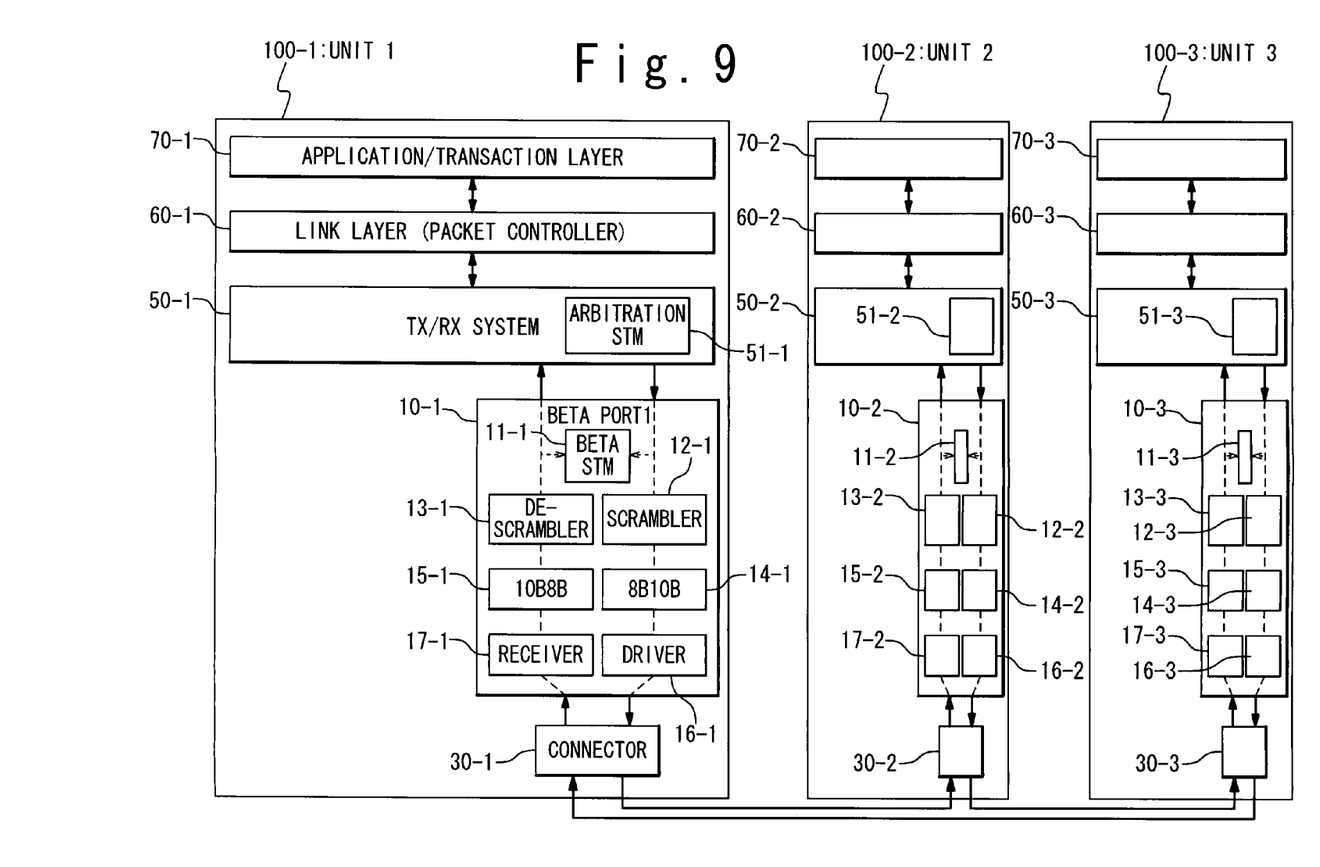
FIG. 9 is a block diagram showing a configuration of a loop communication system according to a first embodiment of the present invention.

FIG. 9 is a block diagram showing a configuration of the loop communication system according to the first embodiment of the present invention. As shown in FIG. 9, the loop communication system in the first embodiment includes three communication units 100 (100-$i$, $i$=1 to 3). Each communication unit 100-$i$ includes a single port 1 (Beta Port1) 10-$i$, a connector 30-$i$, a transmission/reception system circuit (TX/RX System) 50-$i$, a link layer control circuit 60-$i$, and an application/transaction layer control circuit 70-$i$. The connector 30-$i$ is provided for the port 1 (Beta Port1) 10-$i$. The transmission/reception system circuit (TX/RX System) 50-$i$ is located at an upper position of the port 1 (Beta Port1) 10-$i$. Also, the link layer control circuit 60-$i$ is located at the upper position of the transmission/reception system circuit (TX/RX System) 50-$i$, and the application/transaction layer control circuit 70-$i$ is located at the upper position of the link layer control circuit 60-$i$.

The port 1 (Beta Port1) 10-$i$ includes a beta port state machine 11-$i$, a scrambler 12-$i$, a de-scrambler 13-$i$, an 8B10B coding circuit 14-$i$, a 10B8B coding circuit 15-$i$, a driver 16-$i$, and a receiver 17-$i$. Also, the transmission/reception system circuit (TX/RX System) 50-$i$ includes an arbitration state machine 51-$i$.

Figure 13:
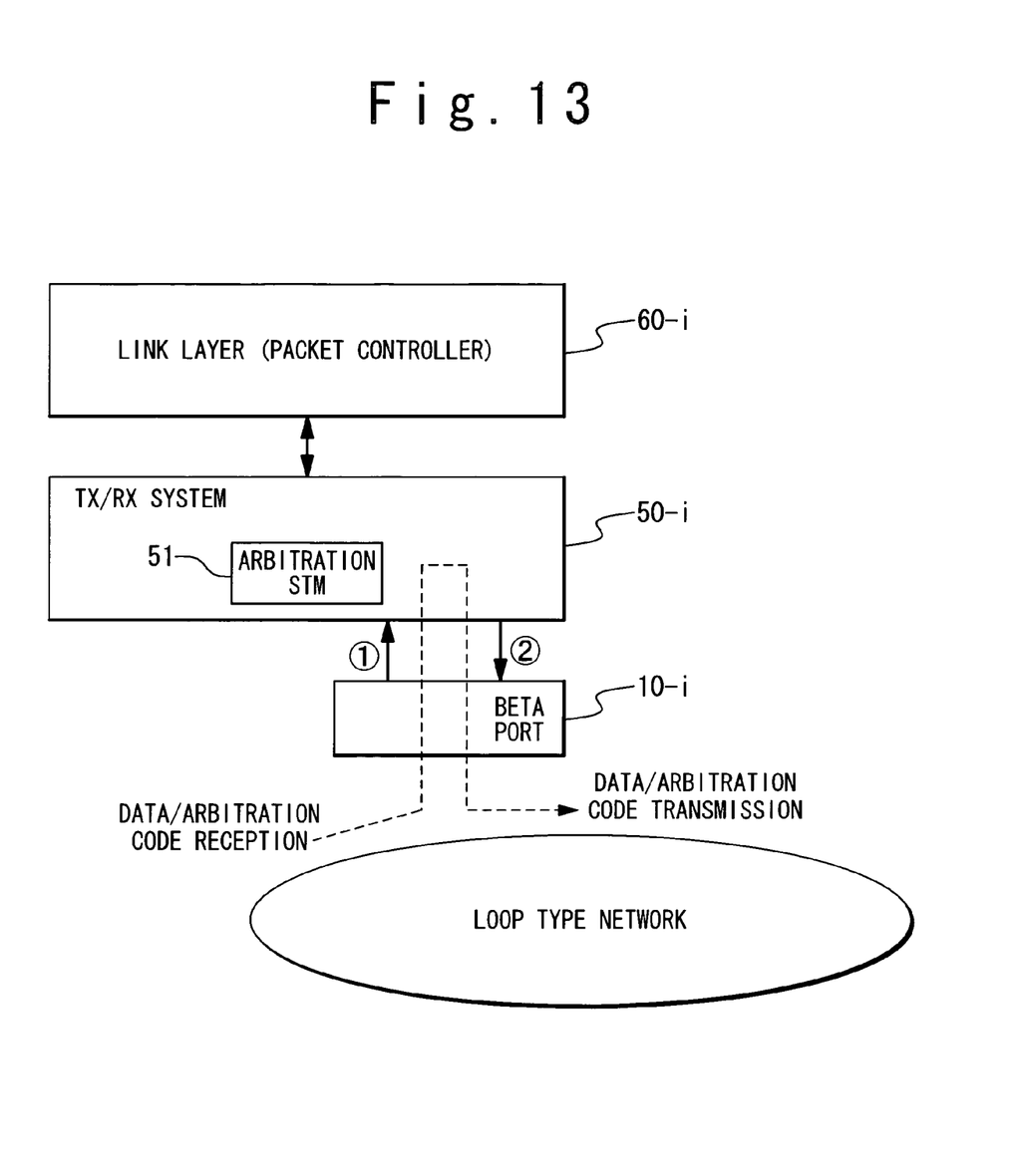
FIG. 13 is a diagram showing a data transfer function in which the determination of data ID is carried out and the received transmission data is not transferred to the circuit at an upper position than the circuit.
Figure 14:
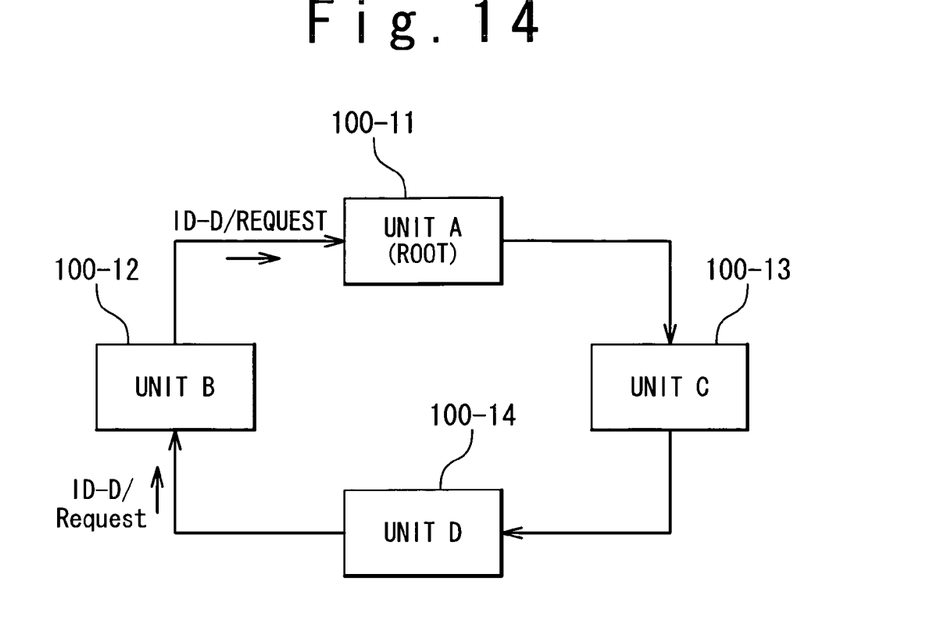
FIG. 14 is a diagram showing an example of transferring a request in the configuration of the present invention.
Figure 15:
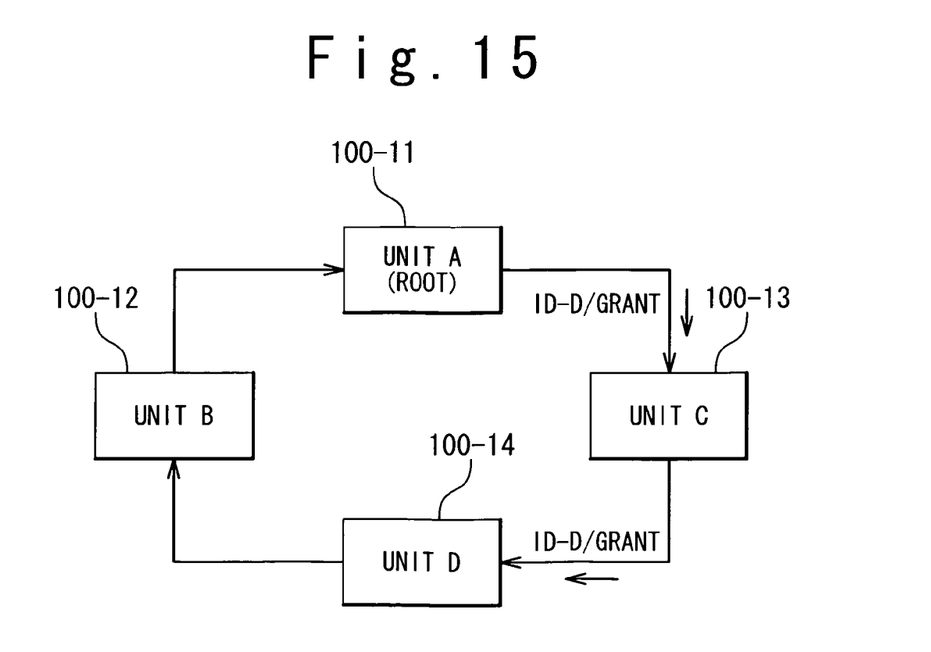
FIG. 15 is a diagram showing an example of transferring a grant in the configuration of the present invention.

Here, the loop communication system will be described by using three communication units connected to constitute a network with a loop structure. The three communication units are the communication unit 1 100-1, and the communication unit 2 100-2 and the communication unit 3 100-3. A port 1 (Beta Port1) 10-1 of the communication unit 1 100-1 is connected through a cable to a port 1 (Beta Port1) 10-2 of the communication unit 2 100-2, and the port 1 (Beta Port1) 10-2 of the communication unit 2 100-2 is similarly connected through a cable to the port 1 (Beta Port1) 10-1 of the communication unit 3 100-3. In the present invention, as shown in FIG. 9, a transmission/reception operation is carried out inside the port (Beta Port), and a loop connection of the cable is attained. Also, a problem in this configuration, namely, the fact that the data is circulated, and then further continues to be transferred is solved by the configuration and method shown in FIGS. 10 to 13. In the present invention, a data ID (identification data) is allocated to each of the communication units 100-$i$. When a transmission data is to be transmitted from one of the communication units, the data ID of the communication unit is added to the transmission data. When the transmission data having the data ID of the communication unit itself is received, the transmission data is discarded without being transferred to a different communication unit as a transmission destination. It should be noted that the transmission data having the data ID of the communication unit itself means the transmission data transmitted by the communication unit itself. Also, through the addition of the data ID, it is possible to accurately transmit an arbitration code signal. FIGS. 14 and 15 are diagrams showing a mechanism for transferring the transmission data and arbitration code signal. As shown in FIG. 14, the communication unit D 100-14 issues a request with the data ID, and the request is granted by the communication unit A 100-11, and the data transmission becomes consequently possible. It should be noted that in the IEEE 1394, the communication unit that has become a root or boss determines the grant of transmission right and issues a grant signal with the data ID of the request. In this way, both of the unit D 100-14 and the unit A 100-11 add the data ID to an arbitration code (request and grant code) signal. If the data ID of the received arbitration code signal is not the ID assigned to the communication unit, the communication unit carries out nothing on the received signal, and transfers the signal to the next communication unit. When the received arbitration code signal has the data ID of the communication unit, the received arbitration code signal is received and a process of arbitration is carried out. Thus, the control target unit becomes clear, resulting in the accurate communication.

Figure 10:
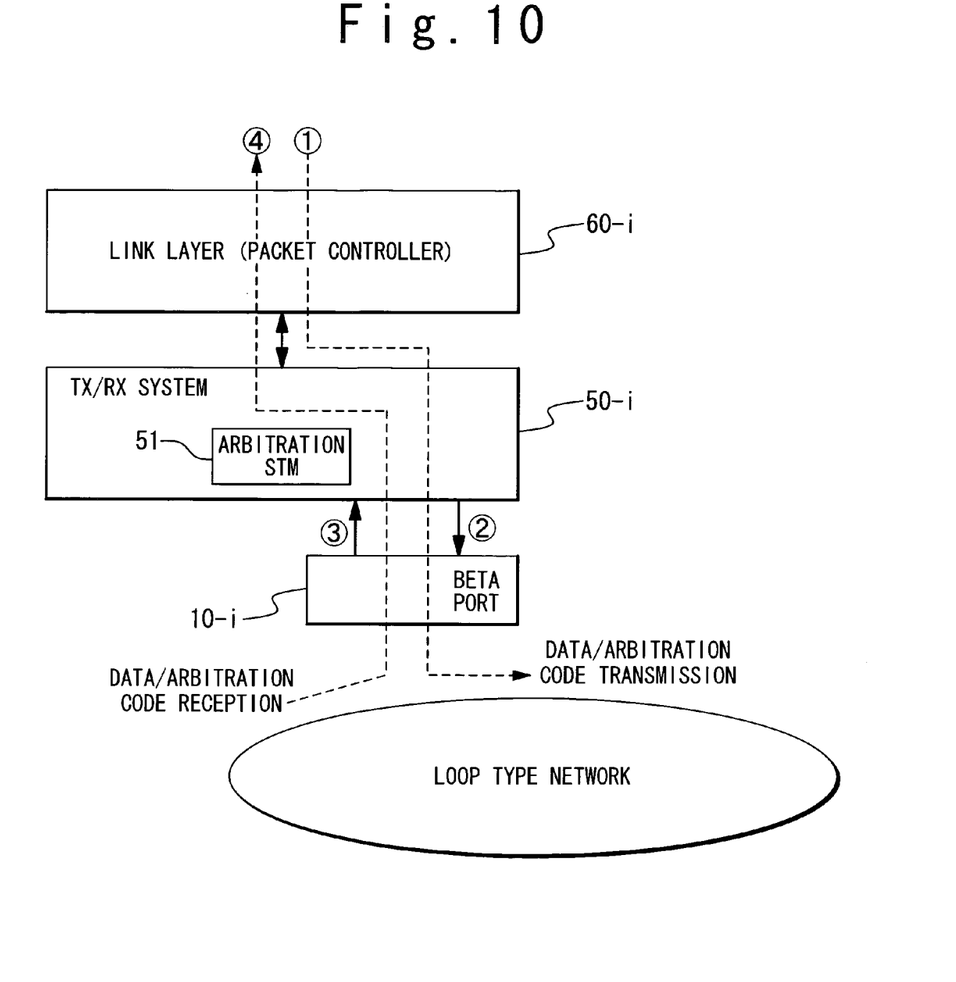
FIG. 10 is a diagram showing transmission and reception functions of the present invention in the first embodiment.
Figure 11:
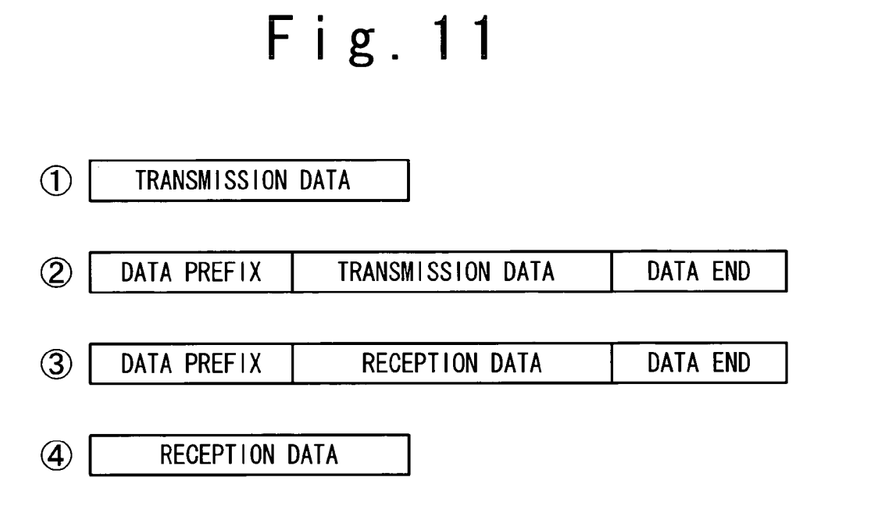
FIG. 11 is a diagram showing data formats in the transmission in the first embodiment.
Figure 12:
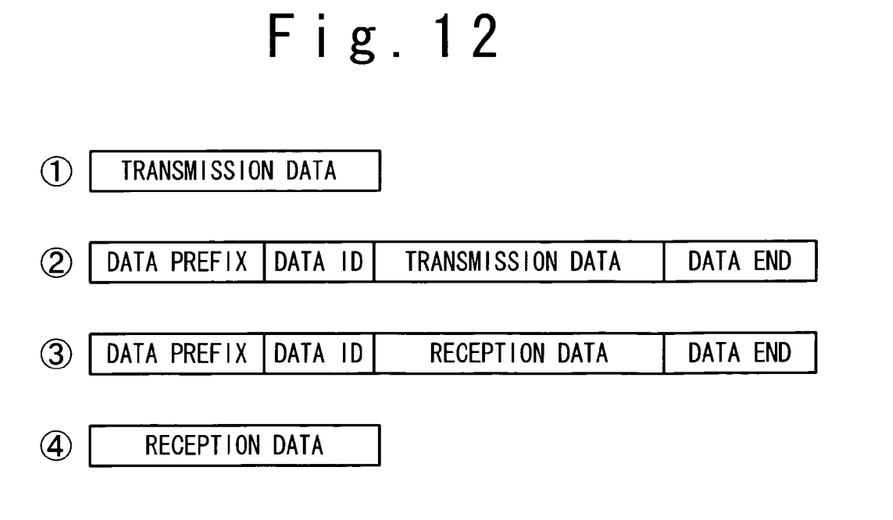
FIG. 12 is a diagram showing data formats in the reception in the first embodiment.

FIG. 10 shows the transmission and reception functions in the loop type network of the present invention. A request signal from the application is transferred on the loop, and the transmission/reception system circuit (TX/RX System) carries out the determination of the arbitration code during the transfer. FIG. 11 shows the conventional data formats. Each of the transmission/reception data is put between the data prefix and the data end. FIG. 12 shows data formats in the present invention, and the data ID is added to the transmission/reception data to be transmitted onto the loop. FIG. 13 is a diagram showing a data transfer function in which the determination of the data ID is carried out in the transmission/reception system circuit 50-$i$ and the received transmission data is not transferred to the circuit at an upper position than the circuit 50-$i$. It should be noted that the addition of the data ID is carried out by the transmission/reception system (TX/RX System) circuit 50-$i$.

In FIGS. 9 to 13, at the time of the transmission, the data ID is allocated to each of the communication units. In case of the IEEE 1394, a node ID is automatically distributed to the each of the communication units at the time of connection of the communication units or at the time of network building-up. Also, only one of the communication units connected to constitute the network has the authority for the network management and referred to as a root or boss. In the reception of the data from the data prefix to the data end, all of the communication units (nodes) can receive it during one circulation, and each communication unit executes the reception process, as necessary. Since a packet having the data ID of the communication unit itself is discarded, the second circulation of the transmission data (an unnecessary circulation of the transmission data) is prevented.

In the conventional communication system, after the acquisition of the transmission right, the transmission/reception system circuit 50-$i$ generates and add the data prefix to the transmission data transmitted from the link layer control circuit 60-$i$. After that, the transmission data with the data prefix is transmitted onto the network. Simultaneously with the transmission completion of the transmission data, the transmission/reception system circuit 50-$i$ generates and transmits the data end.

On the contrary, in the present invention, after the acquisition of the transmission right, the transmission/reception system circuit 50-$i$ generates and transmits the data prefix onto the loop. In succession, the transmission/reception system circuit 50-$i$ generates and transmits the data ID. After that, the transmission/reception system circuit 50-$i$ transmits the transmission data from the link layer control circuit onto the loop. Simultaneously with the completion of the data transmission, the transmission/reception system circuit 50-$i$ generates and transmits the data end.

Referring to FIGS. 14 and 15, the necessity of adding the data ID and its mechanism will be described. FIG. 14 shows a case of the loop structure. The data ID (ID-D) is added to the request signal. The request signal is issued from the communication unit D 100-14 to the communication unit A 100-11. In case of a single loop structure, the data signal cannot be transmitted in a return direction (the direction from the communication unit A 100-11 to the communication unit B 100-12). For this reason, in FIG. 15, after carrying out the determination of the transmission right, the communication unit A 100-11 transmits the data signal to the port different from the input (in the direction from the communication unit A 100-11 to the communication unit C 100-13).

In FIGS. 14 and 15, the arbitration of transmission right for the data transmission is executed. The request signal is issued from one communication unit to the root communication unit in FIG. 14, and the arbitration code signal is transferred from the root communication unit to the communication unit for the allowance of the transmission right in FIG. 15. In case of the IEEE 1394, each communication unit issues the request of the transmission right to the root communication unit, and if the allowance is obtained, the data transfer shown in FIGS. 9 to 13 becomes possible.

It should be noted that in FIG. 14, the communication unit D 100-14 issues the request of the transmission right. On the contrary, in FIG. 15, the communication unit A 100-11 issues the allowance. That is, in FIG. 14, the node ID of the communication unit D 100-14 is added to the arbitration code signal (the request signal in this case), and the communication unit of the request source is clarified. If the communication unit serving as the root issues the allowance to this request, the ID of the request source (the ID of the communication unit D 100-14) is added to the arbitration code signal (the grant signal in this case), and which of the units has been allowed is clarified. The communication unit D 100-14 receives the arbitration code signal (grant signal).

Second Embodiment

Next, the loop communication system according to the second embodiment of the present invention will be described below.

Figure 16:
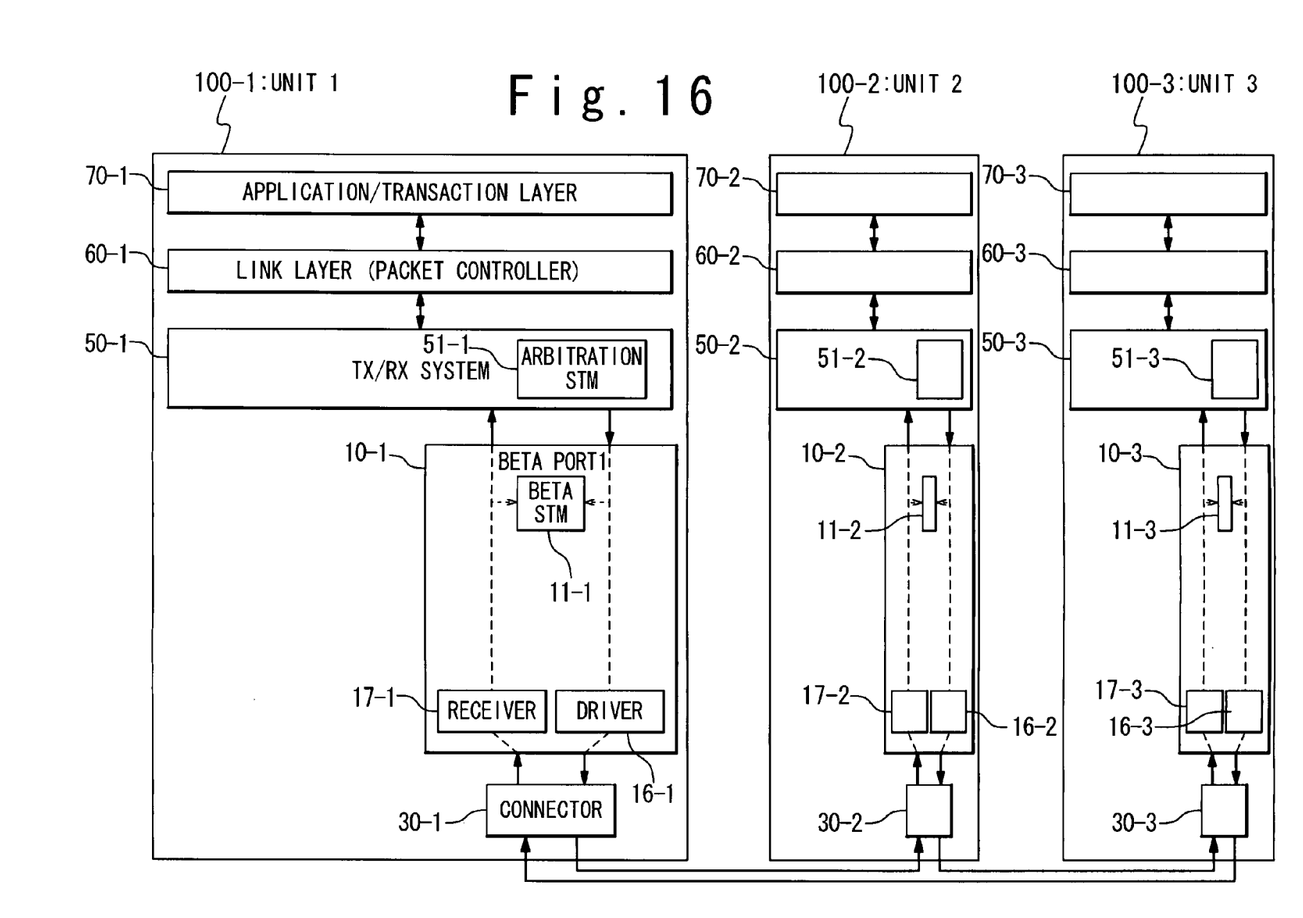
FIG. 16 is a block diagram showing a configuration of the loop communication system according to a second embodiment of the present invention.

Even if the scrambler, the de-scrambler, the 8B10B coding circuit and the 10B8B coding circuit are removed from the port (Beta Port), the loop communication is possible. The port synchronization type system in the present invention usually includes the 8B10B coding circuit and the 10B8B coding circuit in order to improve the precision of clock reproduction and includes the scrambler and the de-scrambler in order to reduce electromagnetic radiation noise. However, those circuits are may be removed in order to miniaturize the circuit. As shown in FIG. 16, one communication unit 100-$i$ includes the port 1 (Beta Port1) 10-$i$, the connector 30-$i$, the transmission/reception system circuit (TX/RX System) 50-$i$, the link layer control circuit 60-$i$, and the application/transaction layer control circuit 70-$i$.

The connector 30-$i$ corresponds to the port 1 (Beta Port1) 10-$i$. The transmission/reception system circuit (TX/RX System) 50-$i$ is located at the upper position of the port 1 (Beta Port1) 10-$i$. Also, the link layer control circuit 60-$i$ is located at the upper position of the transmission/reception system circuit (TX/RX System) 50-$i$, and the application/transaction layer control circuit 70-$i$ is located at the high position of the link layer control circuit 60-$i$. The port 1 (Beta Port1) 10-$i$ includes the beta port state machine 11-$i$, the driver 16-$i$, and the receiver 17-$i$.

Here, the loop communication system in the second embodiment will be described by using the three communication units connected to constitute a network of the loop structure. The communication unit 1 100-1, the communication unit 2 100-2 and the communication unit 3 100-3 are indicated as the three units. The port 1 (Beta Port1) 10-1 of the communication unit 1 100-1 is connected through a cable to the port 1 (Beta Port1) 10-2 of the communication unit 2

100-2, and the port 1 (Beta Port1) 10-2 of the communication unit 2 100-2 is similarly connected through a cable to the port 1 (Beta Port1) 10-1 of the communication unit 3 100-3.

In the second embodiment, since the synchronization control shown in FIGS. 8A and 8B is executed by the state machine (Beta STM in FIG. 16) of the port management, the 8B10 coding circuit and the scrambler can be removed as mentioned above.

As mentioned above, the loop communication system of the present invention has the loop structure in the port synchronization type network system such as the port (Beta Port) of the IEEE 1394b, and the data ID is added to the arbitration code signal and the transmission data. Also, the data ID added to the received arbitration signal and transmission data is determined, thereby carrying out the process corresponding to the determination result. In this way, the present invention provides the loop network structure of the communication units and further provides the data ID addition method in which the target communication unit is clarified at the time of the arbitration of the transmission right and prevents the unnecessary circulation of the same transmission data at the time of the data transfer.

What is claimed is:

1. A loop communication system comprising:
   a plurality of communication devices, wherein each respective communication device of the plurality of the communication devices holds an identification data assigned to said respective communication device, and has a single port used for transmission and reception of a data packet, and which plurality of the communication devices are connected by using said single port of each of the plurality of the communication devices to constitute an IEEE-based port synchronization type network of a loop structure, and
   wherein said data packet from each of said plurality of communication devices is transferred on said network of said loop structure in one direction,
   wherein each of said plurality of communication devices comprises:
      a transmission/reception control circuit;
      a single connector connected to two of said plurality of communication devices through first and second cables; and
      a beta port connected between said transmission/reception control circuit and said connector and configured to transfer said data packet received through said first cable and said connector to said transmission/reception control circuit and to transfer said data packet received from said transmission/reception control circuit onto said second cable through said connector,
   wherein in said communication device, said transmission/reception control circuit receives said data packet from an upstream one of said plurality of communication devices through said first cable, said connector and said beta port, determines whether an identification data contained in said data packet is coincident with said held identification data and discards said data packet when the contained identification data is identical to said held identification data,
   wherein the identification data contained in said data packet is identification data of a transmitter of the data packet,
   wherein said communication device comprises:
      a link layer control circuit configured to generate and send a data prefix and a data end of the data packet to said transmission/reception control circuit when said data packet should be transmitted to a destination communication device; and
      an application/transaction control circuit configured to generate and send said data packet to said transmission/reception control circuit when said data packet should be transmitted to a destination communication device, and
      said transmission/reception control circuit adds said held identification data after said data prefix of said data packet and transmits the data prefix to which said held identification data is added, said data packet, and said data end sequentially to a downstream one of said plurality of communication devices through said beta port, said connector and said second cable.

2. The loop communication system according to claim 1, wherein said application/transaction control circuit issues a request of transmission right, and
   wherein said transmission/reception control circuit adds said held identification data to said request and transmits the request to which the held identification data is added to a root one of said plurality of communication devices.

3. The loop communication system according to claim 2, wherein said transmission/reception control circuit of said root communication device comprises:
   an arbitration state machine configured to carry out arbitration of said transmission right in response to said request, adds said identification data contained in said request to a grant signal when said request is allowed, and transmits said grant signal with said contained identification data to said request issuing communication device.

4. A communication device used in a port synchronization type network of a loop structure, comprising:
   a transmission/reception control circuit;
   a single connector connected to two of a plurality of communication devices through first and second cables;
   a beta port connected between said transmission/reception control circuit and said connector and configured to transfer a data packet received through said first cable and said connector to said transmission/reception control circuit and to transfer said data packet received from said transmission/reception control circuit onto said second cable through said connector;
   a link layer control circuit configured to generate and send a data prefix and a data end of the data packet to said transmission/reception control circuit when said transmission data should be transmitted to a destination communication device; and
   an application/transaction control circuit configured to generate and send said data packet to said transmission/reception control circuit when said data packet should be transmitted to a destination communication device,
   wherein said transmission/reception control circuit holds an identification data assigned to said communication device, and wherein said data packet is transferred on said network of said loop structure in one direction
   wherein said port synchronization type network is an IEEE-based network,
   wherein said transmission/reception control circuit receives said data packet from an upstream one of said plurality of communication devices, determines whether an identification data contained in said data packet is coincident with said held identification data and discards said data packet when the contained identification data is identical to said held identification data, wherein the identification data contained in said data packet is identification data of a transmitter of the data packet, wherein when it is determined that the contained identification data is not identical to the held identification data, said transmission/reception control circuit transmits said packet data to a downstream one of said plurality of communication devices through said beta port, said connector and said second cable, the communication device, and wherein said transmission/reception control circuit adds said held identification data after said data prefix of said data packet and transmits the data prefix to which said held identification data is added, said data packet, and said data end sequentially to a downstream one of said plurality of communication devices through said beta port, said connector and said second cable.

5. The communication device according to claim 4 wherein said application/transaction control circuit issues a request of transmission right, and said transmission/reception control circuit adds said held identification data to said request and transmits the request to which the held identification data is added to a root one of said plurality of communication devices.

6. The communication device according to claim 5, wherein said transmission/reception control circuit of said root communication device comprises:

an arbitration state machine configured to carry out arbitration of said transmission right in response to said request, adds said identification data contained in said request to a grant signal when said request is allowed, and transmits said grant signal with said contained identification data to said request issuing communication device.

7. The communication device according to claim 6, wherein said beta port comprises:

a port state machine configured to carry out synchronization management with other communication devices among the plurality of the communication devices;

a receiver configured to receive said data packet to send to said transmission/reception control circuit; and a driver configured to drive said data packet from said transmission/reception control circuit to said second cable through said connector.

8. A loop communication method, in which a plurality of communication devices are connected to constitute a network of a loop structure, and each respective communication device of said plurality of communication devices holds an identification data assigned to said respective communication device, the loop communication method comprising:

generating a data packet;

transmitting said data packet from each of said plurality of communication devices to a downstream one of said plurality of communication devices on said network of said loop structure in one direction;

issuing, from a request issuing communication device among the plurality of the communication devices, a request of transmission right;

adding said held identification data to said request; and transmitting said request with said identification data to a root one of said plurality of communication devices, wherein said generating the data packet comprises:

generating a transmission data;

adding a data prefix prior to said transmission data;

adding said held identification data after said data prefix and before said transmission data; and adding a data end after said transmission data, wherein said network is an IEEE-based network, where said transmitting said data packet comprises:

receiving, at a respective receiving communication device among the plurality of the communication devices, said data packet from an upstream one of said plurality of communication devices;

determining whether said identification data contained in said data packet is coincident with said held identification data at the respective receiving communication device, wherein the identification data contained in said data packet is identification data of a transmitter of the data packet; and discarding said data packet when the contained identification data is identical to said held identification data.

9. The loop communication method according to claim 8, further comprising:

carrying out arbitration of said transmission right in said root communication device in response to said request;

adding said identification data contained in said request to a grant signal when said request is allowed; and transmitting said grant signal with said contained identification data to said request issuing communication device.

* * * * *